(12) United States Patent
Park et al.

(10) Patent No.: US 12,334,531 B2
(45) Date of Patent: Jun. 17, 2025

(54) ENERGY STORAGE SYSTEM

(71) Applicant: LG ENERGY SOLUTION, LTD., Seoul (KR)

(72) Inventors: Dong-Ho Park, Daejeon (KR); Ji-Ho Yoo, Daejeon (KR); Yong-Tae Lee, Daejeon (KR); Jong-Soo Lee, Daejeon (KR); Sang-Woo Hong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 561 days.

(21) Appl. No.: 17/767,163

(22) PCT Filed: Jan. 20, 2021

(86) PCT No.: PCT/KR2021/095009
§ 371 (c)(1),
(2) Date: Apr. 7, 2022

(87) PCT Pub. No.: WO2021/162538
PCT Pub. Date: Aug. 19, 2021

(65) Prior Publication Data
US 2022/0367944 A1 Nov. 17, 2022

(30) Foreign Application Priority Data
Feb. 14, 2020 (KR) .................. 10-2020-0018535

(51) Int. Cl.
*H01M 10/663* (2014.01)
*H01M 10/48* (2006.01)
(Continued)

(52) U.S. Cl.
CPC ....... *H01M 10/663* (2015.04); *H01M 10/486* (2013.01); *H01M 10/613* (2015.04); *H01M 10/627* (2015.04); *H01M 2220/10* (2013.01)

(58) Field of Classification Search
CPC .......... F24F 13/30; F24F 11/89; F24F 5/0096; F24F 11/84; F24F 11/30; F24F 5/001;
(Continued)

(56) References Cited

U.S. PATENT DOCUMENTS

| 2012/0247136 A1 | 10/2012 | Koo et al. |
| 2017/0256831 A1 | 9/2017 | Hong et al. |
| 2020/0400354 A1 | 12/2020 | Komiya et al. |

FOREIGN PATENT DOCUMENTS

| CN | 102706053 A | 10/2012 | |
| CN | 202737006 U | * 2/2013 | ............. Y02E 60/10 |

(Continued)

OTHER PUBLICATIONS

International Search Report (PCT/ISA/210) issued in PCT/KR2021/095009 mailed on May 31, 2021.
(Continued)

*Primary Examiner* — Kaity V Chandler
(74) *Attorney, Agent, or Firm* — Birch, Stewart, Kolasch & Birch, LLP

(57) ABSTRACT

An energy storage system includes at least one battery rack including at least two battery modules, a container in which the battery rack is received, an air conditioner including an outside heat exchanger configured to cool a heat exchanger medium having a temperature rise in the container, and a circulation path configured to allow the heat exchanger medium to circulate between the container and the outside heat exchanger, a fire extinguishing unit including a fire extinguishing agent tank configured to detect a temperature of the at least one battery module that is equal to or higher than a predetermined temperature or smoke that is generated in the at least one battery module and feed the fire extinguishing agent to the battery module, and an air conditioner management unit configured to spray the fire extinguishing
(Continued)

agent in the fire extinguishing agent tank onto an outer surface of the outside heat exchanger.

10 Claims, 8 Drawing Sheets

(51) Int. Cl.
*H01M 10/613* (2014.01)
*H01M 10/627* (2014.01)

(58) Field of Classification Search
CPC .. F24F 2221/183; F24F 11/64; F24F 2140/20; F24F 2110/10; F24F 11/65; F24F 5/0017; F24F 5/0046; F24F 5/00; F24F 12/00; F24F 5/0003; F24F 2110/00; F24F 13/222; F24F 3/06; F24F 1/00; F24F 11/83; F24F 2005/0064; F24F 2110/20; F24F 11/85; F24F 3/065; F24F 3/14; F24F 11/41; F24F 11/70; F24F 8/10; F24F 11/62; F24F 13/00; F24F 11/67; F24F 11/86; F24F 13/28; F24F 2110/12; F24F 2221/54; F24F 1/0059; F24F 11/42; F24F 11/46; F24F 11/77; F24F 13/22; F24F 11/56; F24F 5/0035; F24F 7/08; F24F 1/0063; F24F 1/32; F24F 1/42; F24F 11/38; F24F 11/88; F24F 2140/12; F24F 1/14; F24F 2005/0025; F24F 2221/34; F24F 7/007; F24F 8/117; F24F 11/00; F24F 11/36; F24F 11/52; F24F 13/24; F24F 2013/228; F24F 7/013; F24F 8/133; F24F 1/00077; F24F 1/0067; F24F 1/16; F24F 1/24; F24F 1/34; F24F 1/38; F24F 11/43; F24F 11/49; F24F 11/54; F24F 2013/247; F24F 3/001; F24F 3/044; F24F 3/052; F24F 5/0021; F24F 5/0071; F24F 8/108; F24F 1/0007; F24F 11/47; F24F 11/61; F24F 13/02; F24F 13/20; F24F 2003/144; F24F 2005/0057; F24F 2005/006; F24F 2013/221; F24F 2221/125; F24F 3/00; F24F 5/0007; F24F 5/0042; F24F 5/0089; F24F 1/0003; F24F 1/0068; F24F 1/027; F24F 11/0001; F24F 11/58; F24F 11/76; F24F 2003/1435; F24F 2003/1458; F24F 2005/0067; F24F 2110/30; F24F 2110/50; F24F 2140/00; F24F 2203/02; F24F 2203/021; F24F 2221/12; F24F 2221/18; F24F 3/1417; F24F 3/147; F24F 6/00; F24F 1/06; F24F 1/46; F24F 11/33; F24F 11/63; F24F 12/003; F24F 12/006; F24F 13/10; F24F 13/32; F24F 2005/0053; F24F 2110/22; F24F 2110/40; F24F 2130/00; F24F 2130/10; F24F 2140/60; F24F 2203/1024; F24F 2203/12; F24F 2221/08; F24F 3/12; F24F 3/16; F24F 3/167; F24F 6/12; F24F 6/16; F24F 7/003; F24F 8/20; F24F 8/22; F24F 8/24; F24F 8/80; F24F 1/00073; F24F 1/0022; F24F 1/0035; F24F 1/0087; F24F 1/0093; F24F 1/022; F24F 1/26; F24F 1/30; F24F 11/0008; F24F 11/32; F24F 11/523; F24F 11/72; F24F 11/74; F24F 11/81; F24F 12/001; F24F 12/002; F24F 2005/0032; F24F 2005/0082; F24F 2006/046; F24F 2006/146; F24F 2007/004; F24F 2011/0004; F24F 2013/205; F24H 4/02; F24H 6/00; F24H 15/45; F24H 15/39; F24H 4/04; F24H 9/2007; F24H 15/223; F24H 15/38; F24H 15/37; F24H 15/227; F24H 15/254; F24H 15/36; F24H 15/258; F24H 4/06; F24H 15/238; F24H 15/375; F24H 15/212; F24H 9/2064; F24H 15/281; F24H 15/219; F24H 1/0018; F24H 15/156; F24H 15/242; F24H 15/35; F24H 9/0005; F24H 9/2021; F24H 15/231; F24H 15/232; F24H 15/385; F24H 15/429; F24H 2240/10; F24H 9/17; F24H 1/00; F24H 1/202; F24H 15/136; F24H 15/305; F24H 15/335; F24H 15/395; B60H 2001/00307; B60H 1/143; B60H 1/034; B60H 1/00271; B60H 1/004; B60H 1/00485; B60H 1/00885; B60H 1/04; B60H 1/3227; B60H 1/00342; B60H 1/2218; B60H 1/00878; B60H 1/00321; B60H 1/00735; B60H 1/00907; B60H 1/3204; B60H 2001/00928; B60H 1/22; B60H 1/32; B60H 1/32284; B60H 1/00385; B60H 1/00899; B60H 1/3228; B60H 2001/2228; B60H 1/00642; B60H 1/06; B60H 2001/00949; B60H 2001/2246; B60H 2001/3289; B60H 1/00; B60H 1/00921; B60H 1/2215; B60H 2001/2265; B60H 1/2221; B60H 1/3223; B60H 1/32281; B60H 1/3229; B60H 1/00007; B60H 1/00378; B60H 1/3213; B60H 1/3222; B60H 1/32331; B60H 1/00021; B60H 1/00285; B60H 1/005; B60H 1/02; B60H 1/3202; B60H 1/3233; B60H 2001/00935; B60H 2001/3288; B60H 3/02; B60H 1/00014; B60H 1/00035; B60H 1/00357; B60H 1/00371; B60H 1/00428; B60H 1/00457; B60H 1/00542; B60H 1/00571; B60H 1/0065; B60H 1/00742; B60H 1/00785; B60H 1/00814; B60H 1/00892; B60H 1/025; B60H 1/3201; B60H 1/3205; B60H 1/321; B60H 1/3232; B60H 2001/00121; B60H 2001/00128; B60H 2001/00235; B60H 2001/003; B60H 2001/2268; B60H 2001/3255; B60H 2001/3257; B60H 3/0092; B60H 3/06; B60H 3/0608
See application file for complete search history.

(56) References Cited

FOREIGN PATENT DOCUMENTS

| | | | | |
|---|---|---|---|---|
| CN | 106816668 | A | 6/2017 | |
| CN | 207407546 | U * | 5/2018 | ............ F25B 21/02 |
| CN | 110165110 | A | 8/2019 | |
| CN | 110360769 | A | 10/2019 | |
| CN | 110578766 | A | 12/2019 | |
| CN | 110701731 | A * | 1/2020 | .......... F24F 2140/20 |
| JP | 3-16520 | Y2 | 4/1991 | |
| JP | 2006-105542 | A | 4/2006 | |
| JP | 2019-075248 | A | 5/2019 | |
| KR | 2003-0043033 | A | 6/2003 | |
| KR | 20-0321073 | Y1 | 7/2003 | |
| KR | 20-0398404 | Y1 | 10/2005 | |
| KR | 10-2007-0006000 | A | 1/2007 | |
| KR | 20-0445599 | Y1 | 8/2009 | |
| KR | 10-1652975 | B1 | 9/2016 | |

(56) References Cited

FOREIGN PATENT DOCUMENTS

| | | |
|---|---|---|
| KR | 10-2021072 B1 | 11/2019 |
| KR | 10-2050803 B1 | 12/2019 |
| WO | WO 2019/198174 A1 | 10/2019 |

OTHER PUBLICATIONS

European Search Report issued in Application No. 21753457.7 dated Sep. 12, 2022.
English machine translation of CN-110576766-A, dated Dec. 17, 2019.

\* cited by examiner

ENERGY STORAGE SYSTEM

TECHNICAL FIELD

The present disclosure relates to an energy storage system, and more particularly, to an energy storage system which increases the heat exchange efficiency of an outside heart exchanger and is easy to maintain and manage an air conditioner.

The present application claims the benefit of Korean Patent Application No. 10-2020-0018535 filed on Feb. 14, 2020 with the Korean Intellectual Properly Office, the disclosure of which is incorporated herein by reference in its entirety.

BACKGROUND ART

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages that recharging can be done whenever it is convenient, the self-discharge rate is very low and the energy density is high.

A lithium secondary battery primarily uses a lithium-based oxide and a carbon material for a positive electrode active material and a negative electrode active material respectively. Additionally, the lithium secondary battery includes an electrode assembly including a positive electrode plate and a negative electrode plate respectively coated with the positive electrode active material and the negative electrode active material and a separator interposed between the positive electrode plate and the negative electrode plate, and a packaging or a battery case in which the electrode assembly is received together with an electrolyte solution in an airtight manner.

Recently, secondary batteries are being widely used in not only small devices such as portable electronic products but also medium- and large-scale devices such as vehicles and energy storage systems (ESSs). For use in medium- and large-scale devices, many secondary batteries are electrically connected to increase the capacity and output. In particular, medium- and large-scale devices use pouch-type secondary batteries since they are easy to stack.

More recently, with the use as a source of energy and the growing need for high capacity structures, there is an increasing demand for an energy storage system including a plurality of battery racks including a plurality of battery packs including a plurality of secondary batteries, a container configured to store the plurality of battery racks therein, and an air conditioner for cooling the plurality of battery racks.

Additionally, in the case of the existing air conditioner of the energy storage system, when the outdoor air temperature is very high in summer time, a heat exchanger (a condenser) of the air conditioner installed outside is not effectively cooled, causing a failure or shutdown (stop) of the air conditioner.

Further, in tropical regions or deserts, the outdoor air temperature is 40° C. or higher, and the small outside heat exchanger (condenser) cannot be effectively cooled, and thus they are replaced with a large outside heat exchanger.

Additionally, in winter time, it is necessary to heat the container in which the battery racks are received inside to prevent the battery packs from being frozen. However, in winter time, frost may form in the heat exchanger mounted in the outside unit, so it is necessary to remove the frost by stopping the internal heating of the container for a while and operating the cooling cycle of the air conditioner in the reverse direction. As a consequence, the heating of the container is stopped for a while, and the plurality of battery packs in the container may be overcooled.

DISCLOSURE

Technical Problem

The present disclosure is designed to solve the above-described problem, and therefore the present disclosure is directed to providing an energy storage system which increases the heat exchange efficiency of an outside heat exchanger and is easy to maintain and manage an air conditioner.

These and other objects and advantages of the present disclosure may be understood by the following description, and will be apparent from the embodiments of the present disclosure. In addition, it will be readily appreciated that the objects and advantages of the present disclosure may be realized by means and combinations thereof.

Technical Solution

To achieve the above-described object, an energy storage system according to the present disclosure includes at least one battery rack, the at least one battery rack including at least two battery modules, a container in which the at least one battery rack is received, an air conditioner including an outside heat exchanger configured to cool a heat exchanger medium and a circulation path configured to allow the heat exchanger medium to circulate between the container and the outside heat exchanger, a fire extinguisher including a fire extinguishing agent tank in which a fire extinguishing agent is stored and configured to detect a temperature of the at least one battery module that is equal to or higher than a first predetermined temperature or smoke that is generated in the at least one battery module and feed the fire extinguishing agent to the at least two battery modules, and an air conditioner manager configured to spray the fire extinguishing agent in the fire extinguishing agent tank onto an outer surface of the outside heat exchanger.

Additionally, the air conditioner manager may further include a feed header having a plurality of nozzles arranged at a predetermined distance to uniformly spray the fire extinguishing agent onto the outer surface of the outside heat exchanger, and the outside heat exchanger may include a spiral pipe having ribs or a tube having a plurality of fins to allow the heat exchanger medium to move along an internal space, the ribs extending linearly along the spiral pipe outwardly from an outer surface of the spiral pipe.

Further, the air conditioner manager may further include a collection plate configured to collect the fire extinguishing agent sprayed onto the outside heat exchanger, a return pipe configured to connect an outlet of the collection plate to an inlet of the fire extinguishing agent tank, and a return pump configured to transfer the fire extinguishing agent collected in the collection plate to the fire extinguishing agent tank through the return pipe.

Additionally, the air conditioner manager may further include a filter disposed in the return pipe to remove contaminants in the collected fire extinguishing agent.

Further, the air conditioner manager may further include a feed pipe configured to connect an outlet of the fire extinguishing agent tank to an inlet of the feed header, a feed pump configured to feed the fire extinguishing agent to the feed header through the feed pipe, an active valve configured to open and close the feed pipe, and a control unit configured to control the operation of the active valve and the feed pump.

Additionally, the air conditioner manager may further include a first temperature sensor configured to measure a temperature of the outside heat exchanger, a second temperature sensor configured to measure a temperature of the fire extinguishing agent in the fire extinguishing agent tank, and a heater configured to heat the fire extinguishing agent in the fire extinguishing agent tank.

Additionally, the control unit may be configured to open the active valve to operate the feed pump when the temperature of the outside heat exchanger is equal to or higher than a second predetermined temperature or is equal to or lower than a third predetermined temperature.

Further, the control unit may be configured to operate the heater to increase the temperature of the fire extinguishing agent in the fire extinguishing agent tank when the temperature of the fire extinguishing agent in the fire extinguishing agent tank is equal to or lower than a fourth predetermined temperature.

Additionally, the fire extinguishing agent tank may further include an antifreeze that is mixed with the fire extinguishing agent.

Further, the air conditioner manager may further include an auxiliary tank configured to store the fire extinguishing agent in the fire extinguishing agent tank and replenish the fire extinguishing agent when an amount of the fire extinguishing agent in the fire extinguishing agent tank is equal to or lower than a predetermined amount.

Advantageous Effects

According to an aspect of the present disclosure, the energy storage system of the present disclosure includes the air conditioner management unit configured to spray the fire extinguishing agent in the fire extinguishing agent tank onto the outer surface of the outside heat exchanger, thereby increasing the heat exchange efficiency of the outside heat exchanger using the enthalpy of vaporization or heat exchange of the fire extinguishing agent sprayed onto the outside heat exchanger. Accordingly, it is possible to apply a small outside heat exchanger, thereby increasing the cost competitiveness of the energy storage system.

Additionally, according to an aspect of the present disclosure, the air conditioner management unit includes the feed header having the plurality of nozzles arranged at a predetermined distance to uniformly spray the fire extinguishing agent onto the outer surface of the outside heat exchanger, and the outside heat exchanger includes the spiral pipe configured to allow the heat exchanger medium to move along the internal space and having the linearly extended rib on the outer surface, so that the fire extinguishing agent fed from the feed header to the outside heat exchanger does not vanish immediately and moves down along the spiral pipe by the gravitational force, thereby effectively increasing the heat exchange rate between the fire extinguishing agent and the spiral pipe. Accordingly, it is possible to maximize the heat exchange (cooling) efficiency of the outside heat exchanger by the air conditioner management unit. Further, it is possible to effectively melt and remove frost formed on the outside heat exchanger in winter time.

BRIEF DESCRIPTION OF THE DRAWINGS

The accompanying drawings illustrate preferred embodiments of the present disclosure, and together with the following detailed description, serve to provide a further understanding of the technical spirit of the present disclosure. However, the present disclosure is not to be construed as being limited to the drawings.

DETAILED DESCRIPTION

Figure 1:
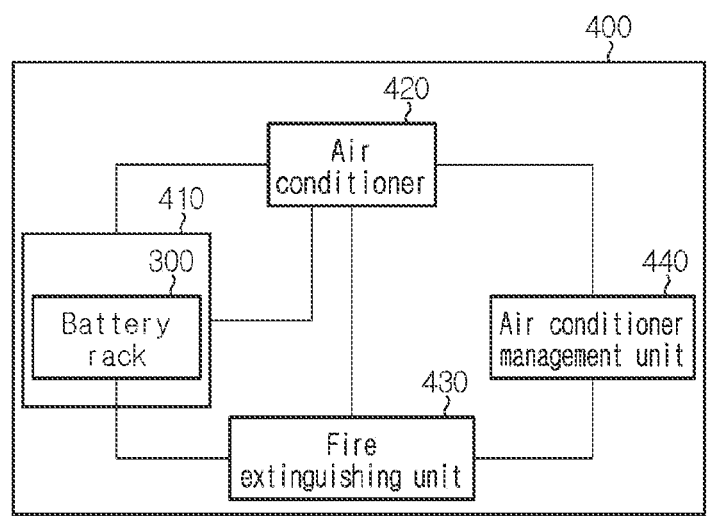
FIG. 1 is a schematic conceptual diagram showing the elements of an energy storage system according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

Figure 2:
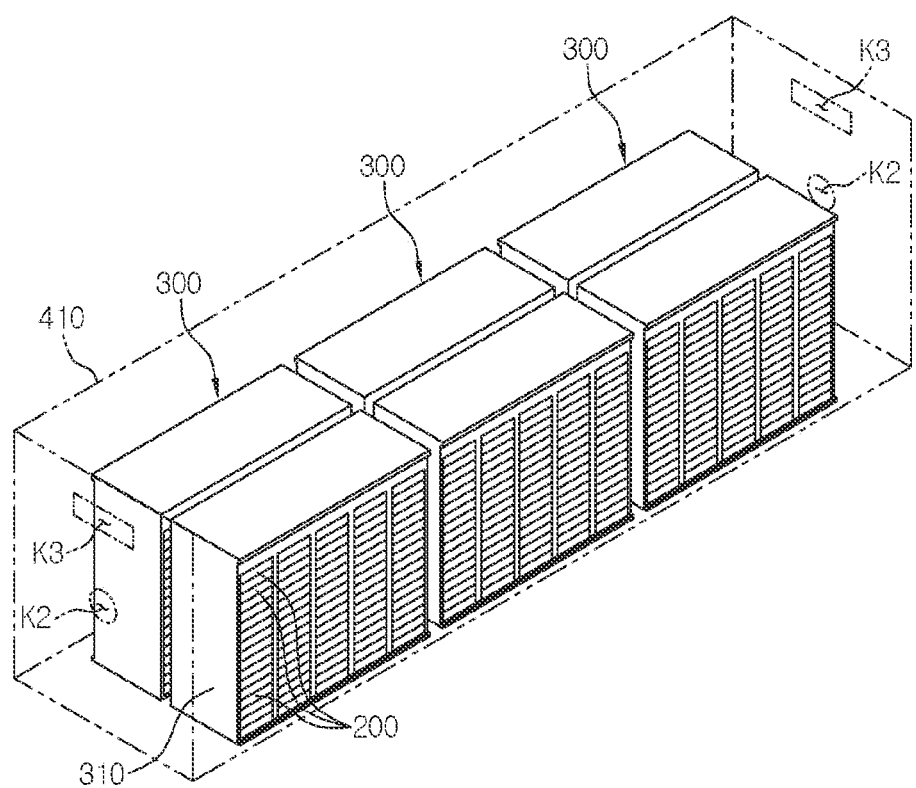
FIG. 2 is a schematic perspective view of a battery rack and a container according to an embodiment of the present disclosure.
Figure 3:
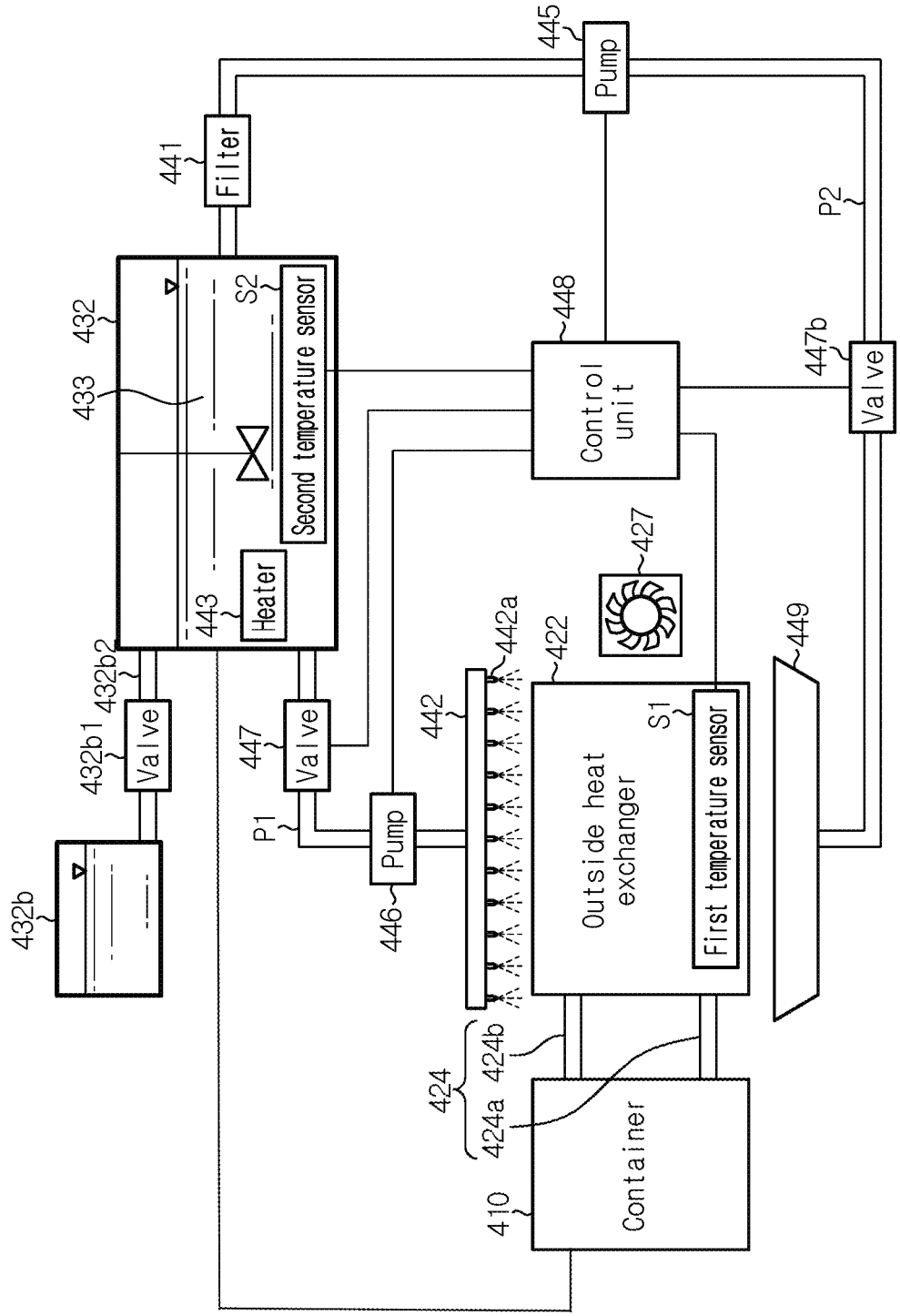
FIG. 3 is a schematic conceptual diagram showing some elements of an energy storage system according to an embodiment of the present disclosure.

FIG. 1 is a schematic conceptual diagram showing the elements of an energy storage system according to an embodiment of the present disclosure. FIG. 2 is a schematic perspective view of a battery rack and a container according to an embodiment of the present disclosure. FIG. 3 is a schematic conceptual diagram showing some elements of the energy storage system according to an embodiment of the present disclosure.

Referring to FIGS. 1 to 3, the energy storage system 400 of the present disclosure includes at least one battery rack 300, a container 410, an air conditioner 420, a fire extinguishing unit 430 and an air conditioner management unit 440.

Here, the battery rack 300 may include at least two battery modules 200. The plurality of battery modules 200 may be arranged in a direction. In this instance, the battery module 200 may include at least one cell assembly (100 in FIG. 4). The cell assembly 100 may have a plurality of secondary batteries 110 arranged in a direction.

Figure 4:
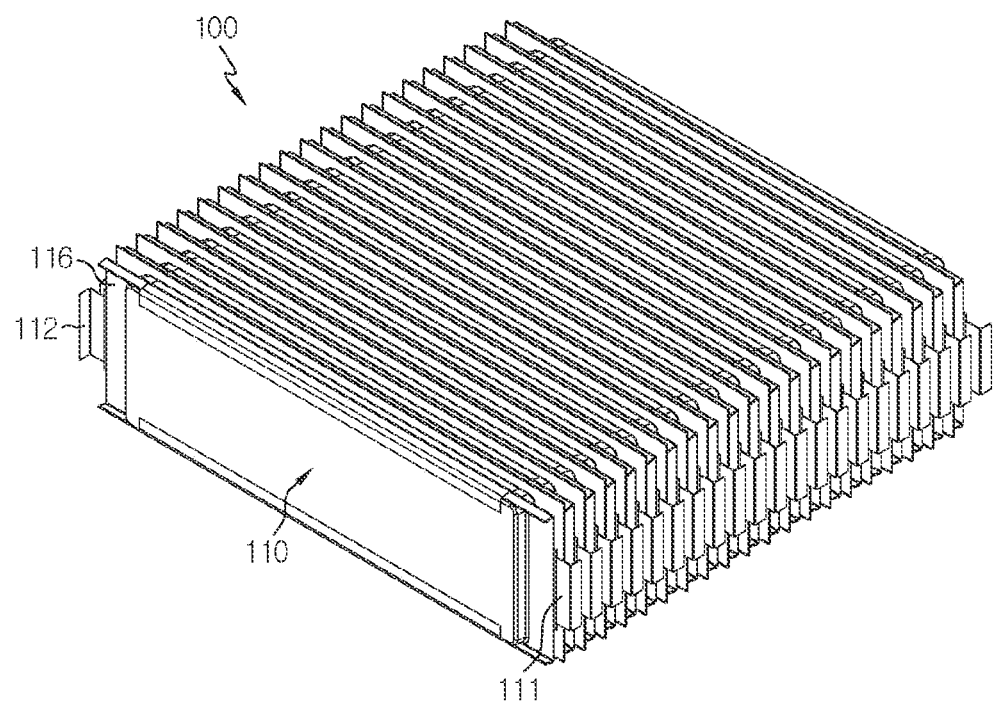
FIG. 4 is a schematic perspective view of a cell assembly of an energy storage system according to an embodiment of the present disclosure.

Additionally, the secondary battery 110 may be a pouch-type secondary battery 110. For example, as shown in FIG. 4, the cell assembly 100 may include a plurality of pouch-type secondary batteries 110 stacked side by side in the front-rear direction. For example, as shown in FIG. 4, one cell assembly 100 may include 21 pouch-type secondary batteries 110.

In particular, the pouch-type secondary battery 110 may include an electrode assembly (not shown), an electrolyte solution (not shown) and a pouch 116.

Further, a positive electrode lead 111 and a negative electrode lead 112 may be formed at the left and right ends with respect to the center of the secondary battery 110. That is, the positive electrode lead 111 may be provided at one end (the right end) with the respect to the center of the secondary battery 110. Additionally, the negative electrode lead 112 may be provided at the other end (the left end) with respect to the center of the secondary battery 110.

However, the battery module 200 according to the present disclosure is not limited to the pouch-type secondary battery 110 as described above and various types of secondary batteries known at the time of filing the patent application may he employed.

Meanwhile, the container 410 may have an internal space for receiving the at least one battery rack 300. The container 410 may have outer walls that form the exterior of the energy storage system 400. For example, the container 410 may be a common type of container 410 commonly used to store a product. The details of the container 410 are omitted herein.

For example, as shown in FIG. 2, the container 410 may be in the shape of a hollow rectangular box. The container 410 has a feeding port K3 at the upper part of each of the front wall and the rear wall to feed the heat exchanger medium. Additionally, the container 410 has a suction port K2 in each of the front wall and the rear wall to suck and discharge the temperature increased heat exchanger medium.

Further, the air conditioner 420 may include an outside heat exchanger 422 configured to cool a heat exchanger medium in the container 410 when the temperature of the heart exchanger medium rises. In addition to the cooling function, the outside heat exchanger 422 may function to increase the temperature of the heat exchanger medium. For example, the outside heat exchanger 422 may include a high thermal conductivity metal (copper, aluminum, or the like). Here, the heat exchanger medium may be, for example, a coolant for industrial use or air.

Additionally, the air conditioner 420 may include a circulation path 424 configured to allow the heat exchanger medium to circulate between the container 410 and the outside heat exchanger 422. That is, the circulation path 424 may include an outlet pipe 424b configured to feed the heat exchanger medium cooled in the outside heat exchanger 422 to the container 410 by a fan 427, and an inlet pipe 424a configured to transfer the temperature increased heat exchanger medium in the container 410 to the outside heat exchanger 422.

Further, the air conditioner 420 may include the fan 427 configured to transfer the heat exchanger medium. The fan 427 may be configured to suck the temperature increased heat exchanger medium in the container 410 and transfer it to the outside heat exchanger 422, or feed the heat exchanger medium subjected to heat exchange in the outside heat exchanger 422 into the container 410.

Meanwhile, the fire extinguishing unit 430 may be configured to detect the temperature of the at least one battery module 200 that is equal to or higher than a predetermined temperature or smoke that is generated in the at least one battery module 200 and feed the fire extinguishing agent 433 to the battery module 200. For example, the predetermined temperature may be 200° C. or more.

Additionally, the fire extinguishing unit 430 may include a fire extinguishing agent tank 432 in which a fire extinguishing agent 433 is stored. The fire extinguishing agent tank 432 may store the fire extinguishing agent 433 therein. For example, the fire extinguishing agent 433 may be an enrichment solution of an inorganic salt such as potassium carbonate, a chemical foam, an air foam, carbon dioxide or water. Additionally, the fire extinguishing agent tank 432 may have compressed gas to spray the fire extinguishing agent 433 or move the fire extinguishing agent 433 along the pipe with the optimal pressure.

Further, the tire extinguishing agent tank 432 may store the fire extinguishing agent 433 therein. For example, the fire extinguishing agent 433 may be, for example, water. Additionally, the tire extinguishing agent tank 432 may have compressed gas to spray the fire extinguishing agent 433 or move the fire extinguishing agent 433 along the pipe with the optimal pressure.

Meanwhile, the air conditioner management unit 440 may be configured to spray the fire extinguishing agent 433 in the fire extinguishing agent tank 432 onto the outer surface of the outside heat exchanger 422. The air conditioner management unit 440 may uniformly spray the fire extinguishing agent 433 in the fire extinguishing agent tank 432 onto a cooling part in which heat exchange of the heat exchanger medium of the outside heat exchanger 422 takes place.

According to this configuration of the present disclosure, the present disclosure includes the air conditioner management unit 440 configured to spray the fire extinguishing agent 433 in the fire extinguishing agent tank 432 onto the outer surface of the outside heat exchanger 422, thereby increasing the heat exchange efficiency of the outside heat exchanger 422 using the enthalpy of vaporization of the fire extinguishing agent 433 sprayed onto the outside heat exchanger 422. Accordingly, it is possible to apply a small outside heat exchanger 422, thereby increasing the cost competitiveness of the energy storage system.

Further, when frost is formed on the outside heat exchanger 422 in winter time, the frost may be removed by spraying the fire extinguishing agent 433. That is, when frost is formed on the outside heat exchanger 422, the conventional art has removed the frost by operating the cooling cycle of the outside heat exchanger 422 in the contrary direction, and to this end, it was inevitable to stop heating the container 410. In contrast, the present disclosure may remove frost on the outside heat exchanger 422 using the fire extinguishing agent 433 of the fire extinguishing unit without stopping heating the container 410 in winter time, thereby avoiding overcooling the battery rack 300.

Figure 5:
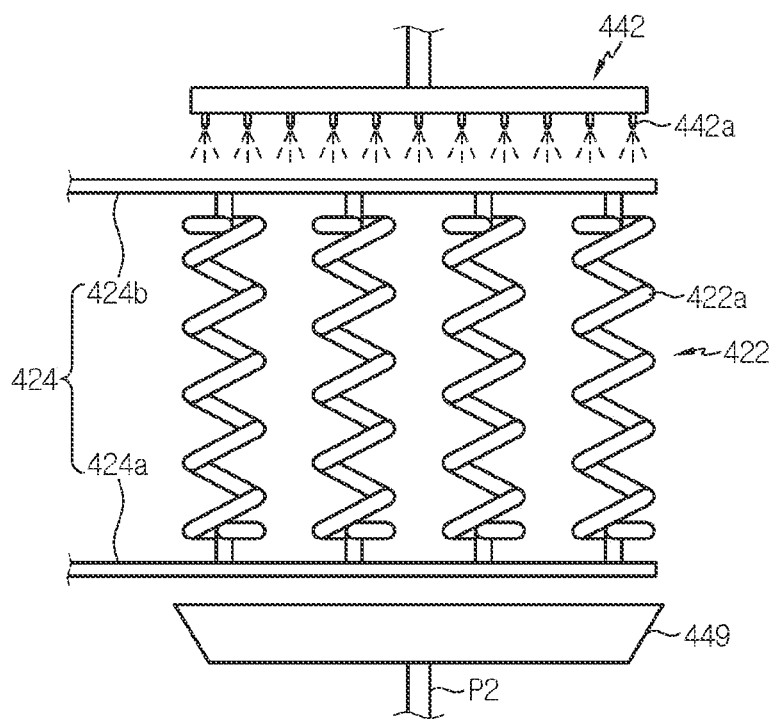
FIG. 5 is a schematic diagram of a feed header, an outside heat exchanger and a collection plate of an energy storage system according to an embodiment of the present disclosure.
Figure 6:
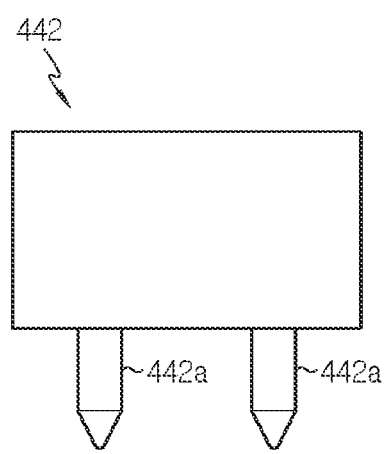
FIG. 6 is a schematic side view of a feed header of an energy storage system according to an embodiment of the present disclosure.

FIG. 5 is a schematic diagram of a feed header, the outside heat exchanger and a collection plate of the energy storage system according to an embodiment of the present disclosure. FIG. 6 is a schematic side view of the feed header of the energy storage system according to an embodiment of the present disclosure. Additionally, FIG. 7 is a schematic cross-sectional view of a spiral pipe of the outside heat exchanger of FIG. 5.

Figure 7:
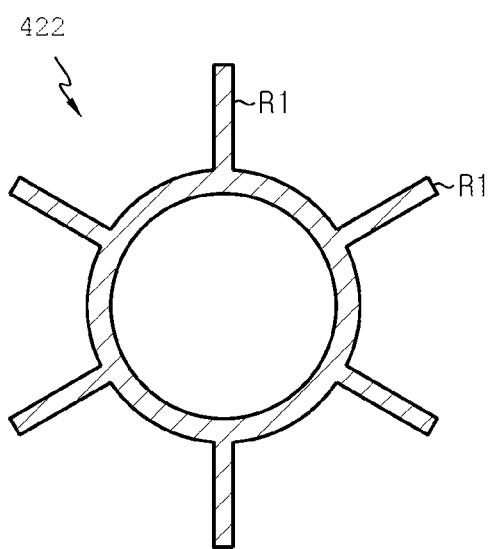
FIG. 7 is a schematic cross-sectional view of a spiral pipe of an outside heat exchanger of FIG. 5.

Referring to FIGS. 5 to 7 together with FIG. 3, the air conditioner management unit 440 may include the feed header 442. The feed header 442 may have a plurality of nozzles 442a arranged at a predetermined distance to uniformly spray the fire extinguishing agent 433 onto the outer surface of the outside heat exchanger 422. For example, as shown in FIG. 6, the pair of nozzles 442a may be arranged at the predetermined distance along the lengthwise direction of the feed header 442 below the feed header 442.

Additionally, the outside heat exchanger 422 may include the spiral pipe 422a that vertically extends. The spiral pipe 422a may be configured to allow the heat exchanger medium to move along the internal space. For example, as shown in FIG. 7, the spiral pipe 422a may have ribs R1 on the outer surface, and the rib R1 may extend linearly along the pipe. The rib R1 may extend outwardly. The spiral pipe 422a may be configured to allow the fire extinguishing agent 433 fed from the feed header 442 to move down along the space between the ribs R1.

According to this configuration of the present disclosure, the air conditioner management unit 440 includes the feed header 442 having the plurality of nozzles 442a arranged at the predetermined distance to uniformly spray the fire extinguishing agent 433 onto the outer surface of the outside heat exchanger 422, and the outside heat exchanger 422 includes the spiral pipe 422a configured to allow the heat exchanger medium to move along the internal space and having, on the outer surface, the ribs R1 linearly extending along the pipe, so the fire extinguishing agent 433 fed from the feed header 442 to the outside heal exchanger 422 does not vanish immediately and moves down along the spiral pipe 422a by the gravitational force, thereby effectively increasing the heat exchange rate between the fire extinguishing agent 433 and the spiral pipe 422a. Accordingly, it is possible to maximize the heat exchange (cooling) efficiency of the outside heat exchanger 422 by the air conditioner management unit 440. Further, it is possible to effectively melt and remove frost formed on the outside heat exchanger 422 in winter time.

Figure 8:
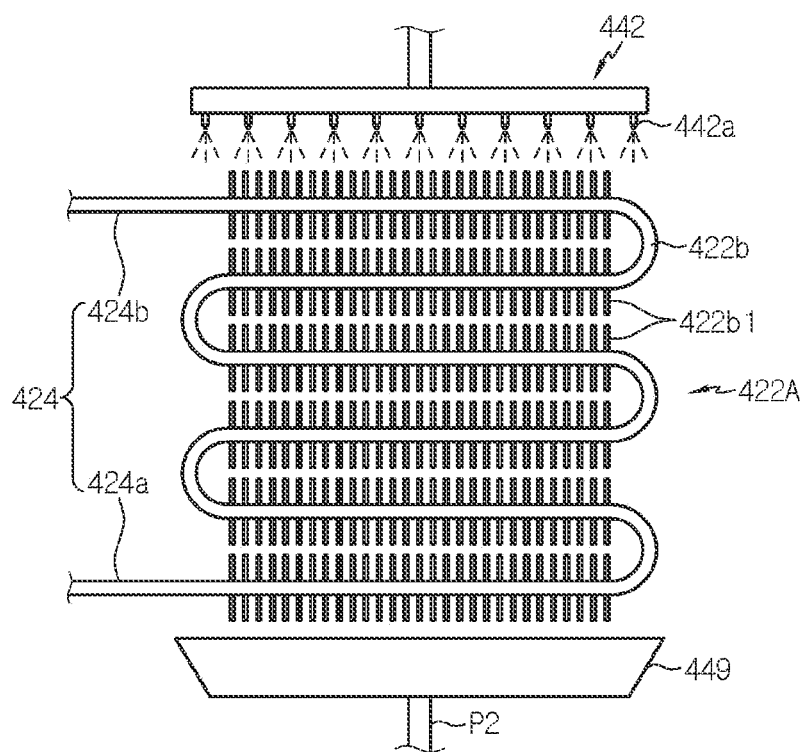
FIG. 8 is a schematic diagram of an outside heat exchanger of an energy storage system according to another embodiment of the present disclosure.

FIG. 8 is a schematic diagram of an outside heat exchanger of the energy storage system according to another embodiment of the present disclosure.

Referring to FIG. 8, when compared with the outside heat exchanger 422 of FIG. 5, the outside heat exchanger 422A of the energy storage system according to another embodiment of the present disclosure may include a tube 422b having a plurality of fins 422b1 instead of the spiral pipe.

In detail, the tube 422b may have one end connected to an outlet pipe 424b configured to feed the cooled heat exchanger medium to the container 410, and the other end connected to an inlet pipe 424a configured to transfer the temperature increased heat exchanger medium in the container 410 to the outside heat exchanger 422A.

According to this configuration of the present disclosure, the present disclosure sprays the fire extinguishing agent from the nozzles 442a of the feed header 442 to the plurality of fins 422b1 and the tube 422b of the outside heat exchanger 422A for the heat exchange between the fire extinguishing agent and the heat exchanger medium, thereby maximizing the cooling efficiency of the heat exchanger.

Referring back to FIG. 3, the air conditioner management unit 440 may further include a feed pipe P1, a feed pump 446, an active valve 447 and a control unit 448. The feed pipe P1 may be configured to connect the outlet of the fire extinguishing agent tank 432 to the inlet of the feed header 442. The feed pump 446 may create pressure to feed the fire extinguishing agent 433 to the feed header 442 through the feed pipe P1. The active valve 447 may he configured to open and close the feed pipe P1 in response to a signal from the control unit 448. The control unit 448 may be configured to control the operation of the active valve 447 and the feed pump 446. The active valve 447 may be, for example, a control valve, an electric valve, a solenoid valve or a pneumatic valve.

Additionally, the air conditioner management unit 440 may further include a collection plate 449, a return pipe P2, a return valve 447b and a return pump 445. The collection plate 449 may he configured to collect the fire extinguishing agent 433 sprayed onto the outside heat exchanger 422. The collection plate 449 may be in the form of a bowl having a sufficient size to cover the bottom of the outside heat exchanger 422.

Further, the return pipe P2 may be a pipe configured to connect the outlet of the collection plate 449 to the inlet of the fire extinguishing agent tank 432. The return pipe P2 may provide a movement passage along which the fire extinguishing agent 433 collected in the collection plate 449 moves to the fire extinguishing agent tank 432. The return valve 447b may he controlled by the control unit 448 to open or close the return pipe P2. The return pump 445 may create pressure to the return pipe P2 to transfer the fire extinguishing agent 433 collected in the collection plate 449 to the fire extinguishing agent tank 432 through the return pipe P2.

Additionally, the air conditioner management unit 440 may further include a first temperature sensor S1, a second temperature sensor S2 and a heater 443. In detail, the first temperature sensor S1 may be configured to measure the temperature of the outside heat exchanger 422. The first temperature sensor S1 may he configured to transmit measured temperature information to the control unit 448 using a signal cable. The second temperature sensor S2 may be configured to measure the temperature of the fire extinguishing agent 433 in the fire extinguishing agent tank 432.

Further, the second temperature sensor S2 may be configured to transmit the measured temperature information to the control unit 448 using a signal cable. The heater 443 may be configured to heat the fire extinguishing agent 433 in the fire extinguishing agent tank 432. The heater 443 may be powered on/off in response to the signal from the control unit 448.

According to this configuration of the present disclosure, the present disclosure further includes the first temperature sensor S1, the second temperature sensor S2 and the heater 443 configured to heat the fire extinguishing agent 433 in the fire extinguishing agent tank 432, so when frost is formed on the outside heat exchanger 422 in winter time, the fire extinguishing agent 433 heated by the heater 443 may be sprayed onto the outside heart exchanger 422. Accordingly, it is possible to remove frost on the outside heat exchanger 422 rapidly.

When the temperature of the outside heat exchanger 422 is equal to or higher than a predetermined temperature, the control unit 448 may be configured to open the active valve 447 to operate the feed pump 446. That is, in case that the cooling efficiency above the cooling capacity of the outside heat exchanger 422 is required in summer time, when the temperature of the outside heat exchanger 422 from the first temperature sensor S1 is equal to or higher than the predetermined temperature (40° C.), the control unit 448 may open the active valve 447 to operate the feed pump 446 to feed the fire extinguishing agent 433 in the fire extinguishing agent tank 432 to the feed header 442.

To the contrary, when the temperature of the outside heat exchanger 422 is equal to or lower than the predetermined temperature (−10° C.), the control unit 448 may open the active valve 447 to operate the feed pump 446 to feed the fire extinguishing agent 433 in the fire extinguishing agent tank 432 to the feed header 442. In this instance, the temperature of the fire extinguishing agent 433 may be increased to about 50° C. or higher by the heater 443.

Additionally, when the temperature of the fire extinguishing agent 433 in the fire extinguishing agent tank 432 is equal to or lower than the predetermined temperature, the control unit 448 may be configured to operate the heater 443 to increase the temperature of the fire extinguishing agent 433 in the fire extinguishing agent tank 432. That is, in case that the energy storage system is installed in winter time or microthermal climate zone, when the temperature of the fire extinguishing agent 433 in the fire extinguishing agent tank 432 received from the second temperature sensor S2 is equal to or lower than the predetermined temperature (for example, 0° C.), the control unit 448 may operate the heater 443 to increase the temperature of the fire extinguishing agent 433 in the fire extinguishing agent tank 432.

According to this configuration of the present disclosure, the present disclosure, the control unit 448 may be configured to operate the heater 443 to increase the temperature of the fire extinguishing agent 433 in the fire extinguishing agent tank 432 when the temperature of the fire extinguishing agent 433 in the fire extinguishing agent tank 432 is equal to or lower than the predetermined temperature, thereby effectively removing frost on the outside heat exchanger 422 in winter time. Further, it is possible to prevent the fire extinguishing agent 433 in the fire extinguishing agent tank 432 from freezing, thereby preventing the failed feeding of the fire extinguishing agent 433 in the event of fires.

Further, the fire extinguishing agent tank 432 may further include an antifreeze (not shown) that is mixed with the fire extinguishing agent 433. The antifreeze may be configured to prevent the fire extinguishing agent 433 from freezing and preserve it in a liquid state at low temperatures. For example, the antifreeze may include ethylene glycol or propylene glycol.

Additionally, the air conditioner management unit 440 may include a filter 441 disposed in the return pipe P2. The filter 441 may be connected to the return pipe P2. The filter 441 may be configured to remove contaminants in the collected fire extinguishing agent 433. The filter 441 may he configured to remove the contaminants having the size of 10 μm or more. The filter 441 may be configured to filter out the contaminants in the fire extinguishing agent 433 passing through the return pipe P2.

According to this configuration of the present disclosure, the air conditioner management unit 440 further includes the filter 441 disposed in the return pipe P2 and configured to remove contaminants in the collected fire extinguishing agent 433, so the contaminants introduced in the process of spraying the fire extinguishing agent 433 onto the outside heat exchanger 422 are removed, thereby avoiding the clogged return pipe P2 or feed pipe P1 due to the contaminants. Accordingly, it is possible to effectively increase the durability of the energy storage system 400.

Referring back to FIG. 3, the air conditioner management unit 440 may further include an auxiliary tank 432b. The auxiliary tank 432b may store an extra fire extinguishing agent 433. When the amount of the tire extinguishing agent 433 in the tire extinguishing agent tank 432 is equal to or lower than a predetermined amount, the auxiliary tank 432b may he configured to replenish the fire extinguishing agent 433.

Further, the fire extinguishing agent tank 432 may include a measurement sensor (not shown) to measure the water level of the fire extinguishing agent 433. The control unit 448 may receive water level information of the fire extinguishing agent 433 in the fire extinguishing agent tank 432 through the measurement sensor. When the water level of the fire extinguishing agent 433 in the fire extinguishing agent tank 432 is equal to or lower than a predetermined water level, the control unit 448 may open an auxiliary valve 432b1 to feed the extra fire extinguishing agent 433 from the auxiliary tank 432b to the fire extinguishing agent tank 432. The auxiliary tank 432b and the fire extinguishing agent tank 432 may be connected with an auxiliary pipe 432b2. The auxiliary pipe 432b2 may be configured to transfer the extra fire extinguishing agent 433 in the auxiliary tank 432b to the fire extinguishing agent tank 432.

Referring back to FIG. 2, the battery rack 300 may further include other element such as a Battery Management System (BMS) inside or outside of a rack case 310.

Additionally, the rack case 310 may be configured to receive the plurality of battery modules 200 in a vertical stack shape. The battery module 200 may he mounted in the rack case 310 with the lower surface placed in parallel to the horizon.

Here, the horizontal direction refers to a direction parallel to the ground when the battery module 200 is placed on the ground, and may be referred to as at least one direction on a plane perpendicular to the vertical direction.

Further, the rack case 310 may have at least one open side through which the battery module 200 is inserted into the internal space. The rack case 310 may he configured to close the open side.

Meanwhile, the energy storage system 400 according to an embodiment of the present disclosure may include at least two battery racks 300. The at least two battery racks 300 may be arranged in a direction. For example, as shown in FIG. 2, the energy storage system 400 may include three battery racks 300 arranged in a direction. Additionally, the energy storage system 400 may include a separate central control unit (not shown) to control the charge and discharge of the three battery racks 300.

The terms indicating directions as used herein such as upper, lower, left, right, front and rear are used for convenience of description only, and it is obvious to those skilled in the art that the term may change depending on the position of the stated element or an observer.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

DESCRIPTION OF REFERENCE NUMERALS

| | |
|---|---|
| 400: Energy storage system | |
| 410: Container | |
| 420: Air conditioner | 422: Outside heat exchanger |
| 424: Circulation path | |
| 430: Fire extinguishing unit | 432: Fire extinguishing agent tank |
| 433: Fire extinguishing agent | |
| 440: Air conditioner management unit | 442: Feed header |
| 442a: Nozzle | 422a, 422b: Spiral pipe, Tube |
| R1: Rib | P1: Feed pipe |
| 446: Feed pump | 447: Active valve |

| | |
|---|---|
| 448: Control unit | 449: Collection plate |
| P2: Return pipe | 445: Return pump |
| S1, S2: First temperature sensor, Second temperature sensor | |
| 443: Heater | 441: Filter |
| 432b: Auxiliary tank | |
| 300: Battery rack | 310: Rack case |
| 200: Battery module | 100: Cell assembly |
| 110: Secondary battery | |

What is claimed is:

1. An energy storage system, comprising:
   at least one battery rack, the at least one battery rack including at least two battery modules;
   a container in which the at least one battery rack is received;
   an air conditioner including an outside heat exchanger configured to cool a heat exchanger medium, and a circulation path configured to allow the heat exchanger medium to circulate between the container and the outside heat exchanger;
   a fire extinguisher including a fire extinguishing agent tank in which a fire extinguishing agent is stored, and configured to detect a temperature of the at least one battery module that is equal to or higher than a first predetermined temperature or smoke that is generated in the at least one battery module and feed the fire extinguishing agent to the at least two battery modules; and
   an air conditioner manager configured to spray the fire extinguishing agent in the fire extinguishing agent tank onto an outer surface of the outside heat exchanger.

2. The energy storage system according to claim 1, wherein the air conditioner manager includes a feed header having a plurality of nozzles arranged at a predetermined distance to uniformly spray the fire extinguishing agent onto the outer surface of the outside heat exchanger, and
   wherein the outside heat exchanger includes a spiral pipe having ribs or a tube having a plurality of fins to allow the heat exchanger medium to move along an internal space, the ribs extending linearly along the spiral pipe outwardly from an outer surface of the spiral pipe.

3. The energy storage system according to claim 2, wherein the air conditioner manager further includes:
   a collection plate configured to collect the fire extinguishing agent sprayed onto the outside heat exchanger;
   a return pipe configured to connect an outlet of the collection plate to an inlet of the fire extinguishing agent tank; and
   a return pump configured to transfer the fire extinguishing agent collected in the collection plate to the fire extinguishing agent tank through the return pipe.

4. The energy storage system according to claim 3, wherein the air conditioner manager further includes a filter disposed in the return pipe to remove contaminants in the collected fire extinguishing agent.

5. The energy storage system according to claim 2, wherein the air conditioner manager further includes:
   a feed pipe configured to connect an outlet of the fire extinguishing agent tank to an inlet of the feed header;
   a feed pump configured to feed the fire extinguishing agent to the feed header through the feed pipe;
   an active valve configured to open and close the feed pipe; and
   a control unit configured to control the operation of the active valve and the feed pump.

6. The energy storage system according to claim 5, wherein the air conditioner manager further includes:
   a first temperature sensor configured to measure a temperature of the outside heat exchanger;
   a second temperature sensor configured to measure a temperature of the fire extinguishing agent in the fire extinguishing agent tank; and
   a heater configured to heat the fire extinguishing agent in the fire extinguishing agent tank.

7. The energy storage system according to claim 6, wherein the control unit is configured to open the active valve to operate the feed pump when the temperature of the outside heat exchanger is equal to or higher than a second predetermined temperature or is equal to or lower than a third predetermined temperature.

8. The energy storage system according to claim 7, wherein the control unit is configured to operate the heater to increase the temperature of the fire extinguishing agent in the fire extinguishing agent tank when the temperature of the fire extinguishing agent in the fire extinguishing agent tank is equal to or lower than a fourth predetermined temperature.

9. The energy storage system according to claim 1, wherein the fire extinguishing agent tank further includes an antifreeze that is mixed with the fire extinguishing agent.

10. The energy storage system according to claim 1, wherein the air conditioner manager further includes an auxiliary tank configured to store the fire extinguishing agent and replenish the fire extinguishing agent in the fire extinguishing agent tank when an amount of the fire extinguishing agent in the fire extinguishing agent tank is equal to or lower than a predetermined amount.

* * * * *